(12) United States Patent
Leem

(10) Patent No.: US 11,308,109 B2
(45) Date of Patent: Apr. 19, 2022

(54) TRANSFER BETWEEN DIFFERENT COMBINATIONS OF SOURCE AND DESTINATION NODES

(71) Applicant: International Business Machines Corporation, Armonk, NY (US)

(72) Inventor: Jin Leem, Durham Country, NC (US)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 16/158,555

(22) Filed: Oct. 12, 2018

(65) Prior Publication Data

US 2020/0117741 A1 Apr. 16, 2020

(51) Int. Cl.
*G06F 16/248* (2019.01)
*G06Q 10/08* (2012.01)
(Continued)

(52) U.S. Cl.
CPC .......... *G06F 16/248* (2019.01); *G06F 3/0482* (2013.01); *G06F 9/542* (2013.01);
(Continued)

(58) Field of Classification Search
CPC ..... H04W 16/14; H04W 24/02; H04W 88/08; H04W 40/02; H04W 40/246; H04W 56/001; H04W 72/0426; G06F 2201/84; G06F 11/14; G06F 11/2074; G06F 16/24532; G06F 16/24542; G06F 16/951; G06F 16/9535; G06F 2212/1032;
(Continued)

(56) References Cited

U.S. PATENT DOCUMENTS 5,278,946 A * 1/1994 Shimada ................. G06F 16/40
706/53
5,481,740 A * 1/1996 Kodosky .................. G06T 1/20
715/839

(Continued)

OTHER PUBLICATIONS

T. Fujiwara, P. Malakar, K. Reda, V. Vishwanath, M. E. Papka and K. Ma, "A Visual Analytics System for Optimizing Communications in Massively Parallel Applications," 2017 IEEE Conference on Visual Analytics Science and Technology (VAST), Phoenix, AZ, 2017, pp. 59-70, doi: 10.1109/VAST.2017.8585646. (Year: 2017).*

(Continued)

*Primary Examiner* — Jeremy L Stanley
(74) *Attorney, Agent, or Firm* — Edell, Shapiro & Finnan, LLC

(57) ABSTRACT

According to a present invention embodiment, items are transferred between source and destination nodes. A search is performed for one or more source nodes and one or more destination nodes based on search criteria. Graphical representations of the source and destination nodes resulting from the search are generated and presented on a user interface. A graphical connector is manipulated to connect a first quantity of source nodes to a second quantity of destination nodes on the user interface, wherein at least one from a group of the first quantity and the second quantity represent a plurality of nodes from the user interface. One or more items are transferred from the first quantity of source nodes to the second quantity of destination nodes based on connections indicated by the graphical connector.

18 Claims, 9 Drawing Sheets

(51) Int. Cl.
*G06F 3/0482* (2013.01)
*G06F 9/54* (2006.01)
*G06F 16/23* (2019.01)
*G06F 16/9535* (2019.01)

(52) U.S. Cl.
CPC .......... *G06F 16/23* (2019.01); *G06F 16/9535* (2019.01); *G06Q 10/087* (2013.01)

(58) Field of Classification Search
CPC ...... G06F 3/067; G06F 9/546; G06F 11/0709; G06F 11/0721; G06F 11/1675; G06F 11/2082; G06F 3/061; G06F 9/465; G06F 2201/87; G06F 15/177; G06F 16/00; G06F 16/148; G06F 16/2465; G06F 16/285; G06F 16/288; G06F 2216/03; G06F 16/248; G06F 16/23; G06F 3/0482; G06F 9/542; G06Q 10/087
See application file for complete search history.

(56) References Cited

U.S. PATENT DOCUMENTS

| | | | | |
|---|---|---|---|---|
| 5,644,686 A * | 7/1997 | Hekmatpour | | G06N 5/02 706/45 |
| 5,737,622 A * | 4/1998 | Rogers | | G06F 30/20 713/324 |
| 5,908,465 A * | 6/1999 | Ito | | G01C 21/3614 340/995.27 |
| 6,161,144 A * | 12/2000 | Michels | | H04L 12/56 370/392 |
| 6,314,556 B1 * | 11/2001 | DeBusk | | G06Q 10/10 717/107 |
| 6,452,915 B1 * | 9/2002 | Jorgensen | | H04L 47/14 370/338 |
| 6,453,419 B1 * | 9/2002 | Flint | | H04L 29/06 726/1 |
| 6,711,562 B1 * | 3/2004 | Ross | | G06F 16/2246 707/741 |
| 6,833,840 B2 * | 12/2004 | Lifshitz | | G06T 9/00 345/619 |
| 7,392,378 B1 * | 6/2008 | Elliott | | H04L 63/0428 380/277 |
| 7,406,054 B2 * | 7/2008 | Seo | | H04L 45/00 370/235 |
| 7,441,267 B1 * | 10/2008 | Elliott | | H04L 63/0428 713/153 |
| 7,592,833 B1 * | 9/2009 | Weiss | | G06F 30/34 326/38 |
| 7,725,763 B2 * | 5/2010 | Vertes | | G06F 11/2097 714/6.12 |
| 7,877,327 B2 * | 1/2011 | Gwiazda | | G06F 16/958 705/52 |
| 7,885,762 B2 * | 2/2011 | Tajima | | G01C 21/3617 701/423 |
| 8,150,860 B1 * | 4/2012 | Cierniak | | G06F 16/9024 707/750 |
| 8,442,885 B1 * | 5/2013 | Carrie | | G06Q 40/04 705/35 |
| 8,584,046 B2 * | 11/2013 | Lee | | G06F 17/2211 715/854 |
| 8,930,830 B2 * | 1/2015 | Solaja | | G06F 9/542 715/761 |
| 8,972,372 B2 * | 3/2015 | Elbaum | | G06F 8/70 707/706 |
| 9,183,242 B1 * | 11/2015 | Plevyak | | G06F 16/2379 |
| 9,250,759 B1 | 2/2016 | Commons | | |
| 9,280,574 B2 | 3/2016 | Jackson, Jr. | | |
| 9,383,905 B1 * | 7/2016 | Kumar | | G06F 3/048 |
| 9,450,901 B1 * | 9/2016 | Smullen | | H04L 51/046 |
| 9,684,732 B2 * | 6/2017 | Ma | | G06F 16/957 |
| 10,489,387 B1 * | 11/2019 | Rogynskyy | | G06F 16/219 |
| 10,503,483 B2 * | 12/2019 | Tjiong | | G06F 3/048 |
| 10,649,449 B2 * | 5/2020 | Bell | | G05B 23/024 |
| 10,678,225 B2 * | 6/2020 | Kidd | | G05B 19/41865 |
| 10,692,043 B1 * | 6/2020 | Woodyard | | G06Q 50/28 |
| 2002/0078269 A1 * | 6/2002 | Agarwala | | G06F 13/28 710/22 |
| 2002/0140707 A1 * | 10/2002 | Samra | | G11B 27/34 345/619 |
| 2003/0009361 A1 * | 1/2003 | Hancock | | G06Q 10/0875 709/219 |
| 2003/0061191 A1 * | 3/2003 | Pearson | | G06F 7/32 |
| 2003/0079010 A1 * | 4/2003 | Osborn | | H04L 67/325 709/224 |
| 2003/0107996 A1 * | 6/2003 | Black | | H04L 49/357 370/235 |
| 2004/0073702 A1 * | 4/2004 | Rong | | H04L 45/12 709/241 |
| 2005/0068901 A1 * | 3/2005 | Nurminen | | H04L 41/0893 370/252 |
| 2005/0132304 A1 * | 6/2005 | Guido | | G06F 16/904 715/853 |
| 2005/0262056 A1 * | 11/2005 | Hamzy | | G06F 8/36 |
| 2005/0273721 A1 * | 12/2005 | Yantis | | G06F 16/258 715/762 |
| 2006/0036568 A1 * | 2/2006 | Moore | | G06F 16/168 |
| 2006/0109787 A1 * | 5/2006 | Strutt | | H04L 45/125 370/235 |
| 2006/0156314 A1 * | 7/2006 | Waldorf | | G06F 9/451 719/328 |
| 2006/0161869 A1 * | 7/2006 | Robertson | | G06F 3/0482 715/853 |
| 2006/0190355 A1 * | 8/2006 | Jammes | | G06F 16/958 705/27.1 |
| 2006/0256768 A1 * | 11/2006 | Chan | | H04L 1/08 709/238 |
| 2007/0016579 A1 * | 1/2007 | Kaul | | G06F 16/951 |
| 2007/0214136 A1 * | 9/2007 | MacLennan | | G06F 16/9038 |
| 2008/0120129 A1 * | 5/2008 | Seubert | | G06Q 10/06 705/35 |
| 2008/0312987 A1 * | 12/2008 | Damodaran | | G06Q 10/087 705/7.27 |
| 2009/0022161 A1 * | 1/2009 | Hirano | | H04L 45/26 370/400 |
| 2009/0089670 A1 * | 4/2009 | Gooding | | G06F 15/16 715/700 |
| 2009/0135764 A1 * | 5/2009 | In | | H04W 40/02 370/328 |
| 2009/0198714 A1 * | 8/2009 | Wake | | G06F 16/9027 |
| 2010/0083185 A1 * | 4/2010 | Sakai | | G06F 8/433 715/853 |
| 2011/0038254 A1 * | 2/2011 | Hashiguchi | | H04L 45/1283 370/217 |
| 2011/0134127 A1 * | 6/2011 | Gundlapalli | | G06Q 90/00 345/440 |
| 2011/0151890 A1 * | 6/2011 | Platt | | H04L 51/04 455/456.1 |
| 2011/0320308 A1 * | 12/2011 | Dearlove | | G06Q 10/083 705/26.8 |
| 2012/0124073 A1 * | 5/2012 | Gross | | G06F 16/954 707/767 |
| 2012/0146996 A1 * | 6/2012 | Kamiyama | | G06F 3/0481 345/419 |
| 2012/0210041 A1 * | 8/2012 | Flynn | | G06F 3/0656 711/3 |
| 2012/0254131 A1 * | 10/2012 | Al Kiswany | | G06F 16/188 707/692 |
| 2012/0307829 A1 * | 12/2012 | Hyoudou | | H04L 47/17 370/392 |
| 2013/0034085 A1 * | 2/2013 | Bostrom | | H04W 56/0045 370/336 |
| 2013/0163568 A1 * | 6/2013 | Chang | | H04J 3/14 370/336 |
| 2013/0218821 A1 * | 8/2013 | Szatmary | | G06N 3/10 706/25 |
| 2014/0047086 A1 * | 2/2014 | Klimetschek | | G06F 15/177 709/222 |

(56) References Cited

U.S. PATENT DOCUMENTS

| | | | | |
|---|---|---|---|---|
| 2014/0303962 | A1* | 10/2014 | Minca | G06F 40/242 704/9 |
| 2015/0106358 | A1* | 4/2015 | Nachum | G06F 16/248 707/722 |
| 2015/0142796 | A1* | 5/2015 | Floreskul | G06F 17/10 707/736 |
| 2015/0195201 | A1* | 7/2015 | Li | H04L 45/02 370/392 |
| 2015/0296279 | A1* | 10/2015 | Bouda | H04L 41/142 398/45 |
| 2016/0034587 | A1* | 2/2016 | Barber | G06F 16/24532 707/754 |
| 2016/0078648 | A1* | 3/2016 | Gagnon | G06F 8/34 345/619 |
| 2016/0100006 | A1* | 4/2016 | Markus | H04L 67/1097 709/219 |
| 2016/0217399 | A1* | 7/2016 | Roelofs | G06Q 10/0635 |
| 2016/0277299 | A1* | 9/2016 | Kadaba | H04L 41/142 |
| 2016/0359673 | A1* | 12/2016 | Gupta | G06F 3/04842 |
| 2016/0360048 | A1* | 12/2016 | Yasuma | H04N 1/00244 |
| 2017/0083585 | A1* | 3/2017 | Chen | G06F 11/323 |
| 2017/0217683 | A1* | 8/2017 | Lyon | B65G 1/1373 |
| 2017/0264704 | A1* | 9/2017 | Kikuchi | H04L 47/41 |
| 2017/0310595 | A1* | 10/2017 | Avidar | G06Q 10/047 |
| 2018/0013826 | A1* | 1/2018 | Sikdar | H04L 67/1097 |
| 2018/0225194 | A1* | 8/2018 | Saleh-Esa | G06F 11/3664 |
| 2018/0307909 | A1* | 10/2018 | O'Brien | G06F 3/0426 |
| 2019/0179681 | A1* | 6/2019 | Spector | G06Q 40/02 |
| 2019/0258979 | A1* | 8/2019 | Mulay | G06Q 10/06315 |
| 2019/0287151 | A1* | 9/2019 | Becker | G06Q 30/0631 |
| 2019/0332365 | A1* | 10/2019 | Naganuma | G06F 8/33 |
| 2020/0067783 | A1* | 2/2020 | Kamath | H04L 43/08 |
| 2020/0162355 | A1* | 5/2020 | Zacks | H04L 43/10 |

OTHER PUBLICATIONS

A. J. Pretorius and J. J. van Wijk, "Bridging the Semantic Gap: Visualizing Transition Graphs with User-Defined Diagrams," in IEEE Computer Graphics and Applications, vol. 27, No. 5, pp. 58-66, Sep.-Oct. 2007, doi: 10.1109/MCG.2007.121. (Year: 2007).*

D. Archambault, T. Munzner and D. Auber, "Tugging Graphs Faster: Efficiently Modifying Path-Preserving Hierarchies for Browsing Paths," in IEEE Transactions on Visualization and Computer Graphics, vol. 17, No. 3, pp. 276-289, Mar. 2011, doi: 10.1109/TVCG.2010.60. (Year: 2011).*

Eichner et al., "Direct Visual Editing of Node Attributes in Graphs", Informatics 2016, 3, 17; doi:10.3390/informatics3040017, www.mdpi.com/journal/informatics, 2016, pp. 1-19.

Holten et al., "Force-Directed Edge Bundling for Graph Visualization", Eurographics/IEEE-VGTC Symposium on Visualization 2009, vol. 28, No. 3, 2009, 8 pages.

Phan, "Supporting the Visualization and Forensic Analysis of Network Events", Dec. 2007, 128 pages.

Anonymously, "Network Visualization Tool Using 3D Visual Diagrams to Describe Virtual Network Functions", An IP.com Prior Art Database Technical Disclosure, IPCOM000248148D, Nov. 1, 2016, 21 pages.

"IBM Mashup Center", Wikipedia, https://en.wikipedia.org/wiki/IBM_Mashup_Center, retrieved from internet Sep. 2018, 3 pages.

Screenshot of IBM Mashup Center, Apr. 2018, 1 page.

Mobile and Online Bill Pay, Bank of America, https://www.bankofamerica.com/online-banking/mobile-and-online-banking-features/bill-pay/. Aug. 23, 2018, 5 pages.

* cited by examiner

TRANSFER BETWEEN DIFFERENT COMBINATIONS OF SOURCE AND DESTINATION NODES

BACKGROUND

1. Technical Field

Present invention embodiments relate to electronic transfer systems, and more specifically, to transferring items between various combinations and quantities of source and destination nodes.

2. Discussion of the Related Art

User interfaces enabling transfer of items between source and destination nodes are typically limited to transfers between a single source node and a single destination node. The source node and destination node are each selected from a user interface, where a presented view of the transfer is limited to the selected nodes. Since other available nodes are not provided in the presented view of the transfer, various alternative options for the transfer through other nodes may be concealed, thereby obviating discovery of more efficient manners of performing the transfer.

Further, a complex transfer may include plural transfers between several source and destination nodes. In order to perform a complex transfer on the user interface, the complex transfer is decomposed into several sub-transfers each between a single source node and a single destination node, thereby requiring repeated selection of the source and destination nodes and initiation for each of the sub-transfers.

SUMMARY

According to one embodiment of the present invention, a system comprises at least one processor, and transfers items between source and destination nodes. A search is performed for one or more source nodes and one or more destination nodes based on search criteria. Graphical representations of the source and destination nodes resulting from the search are generated and presented on a user interface. A graphical connector is manipulated to connect a first quantity of source nodes to a second quantity of destination nodes on the user interface, wherein at least one from a group of the first quantity and the second quantity represent a plurality of nodes from the user interface. One or more items are transferred from the first quantity of source nodes to the second quantity of destination nodes based on connections indicated by the graphical connector. Embodiments of the present invention further include a method and computer program product for transferring items between source and destination nodes in substantially the same manner described above.

BRIEF DESCRIPTION OF THE DRAWINGS

Generally, like reference numerals in the various figures are utilized to designate like components.

DETAILED DESCRIPTION

Present invention embodiments enable transfers between various combinations and quantities of source and destination nodes for various scenarios. The present invention embodiments may accommodate transfers between a single source node and a single destination node in addition to transfers of greater complexity. For example, transfers between different variations of nodes may be accomplished in a work space (e.g., a single source node to a single destination node; a single source node to plural destination nodes; plural source nodes to a single destination node; plural source nodes to plural destination nodes; or any combinations thereof). Present invention embodiments are applicable to various contexts (e.g., inventory, banking or other financial accounts, etc.) and transference of varying items (e.g., physical items, numeric values or data, orders, etc.).

Present invention embodiments are visually engaging and reduce confusion when performing plural complex transfers. Plural source and destination nodes may be visually provided prior to initiating a transfer to enable comparison of different node options. This enables the option providing optimal benefits (e.g. with respect to cost, transfer time, etc.) to be determined and selected.

Further, the interaction and manner in which nodes are displayed is three dimensional to provide a much broader view of surroundings and options prior to initiating a transfer. Plural transfers may be performed at once in a work space. This reduces searching of nodes and clicking and navigating between network pages to conserve computing resources and improve computer performance. Since plural complex transfers may be performed at once in the work space, repeated performance of the same task plural times is avoided for complex transfers. Present invention embodiments provide an amount available to move and visually shows the changes at the source and destination nodes resulting from the transfers. In addition, present invention embodiments may monitor physical transfers through sensing devices (e.g., RFID, GPS, scanning devices and corresponding codes/devices, etc.), and provide status (e.g., real-time, periodic or other updates, updates as items are transferred between locations, etc.) of the progress of the transfer (e.g., initiated, completed, percentage or amount completed, etc.).

Figure 1:
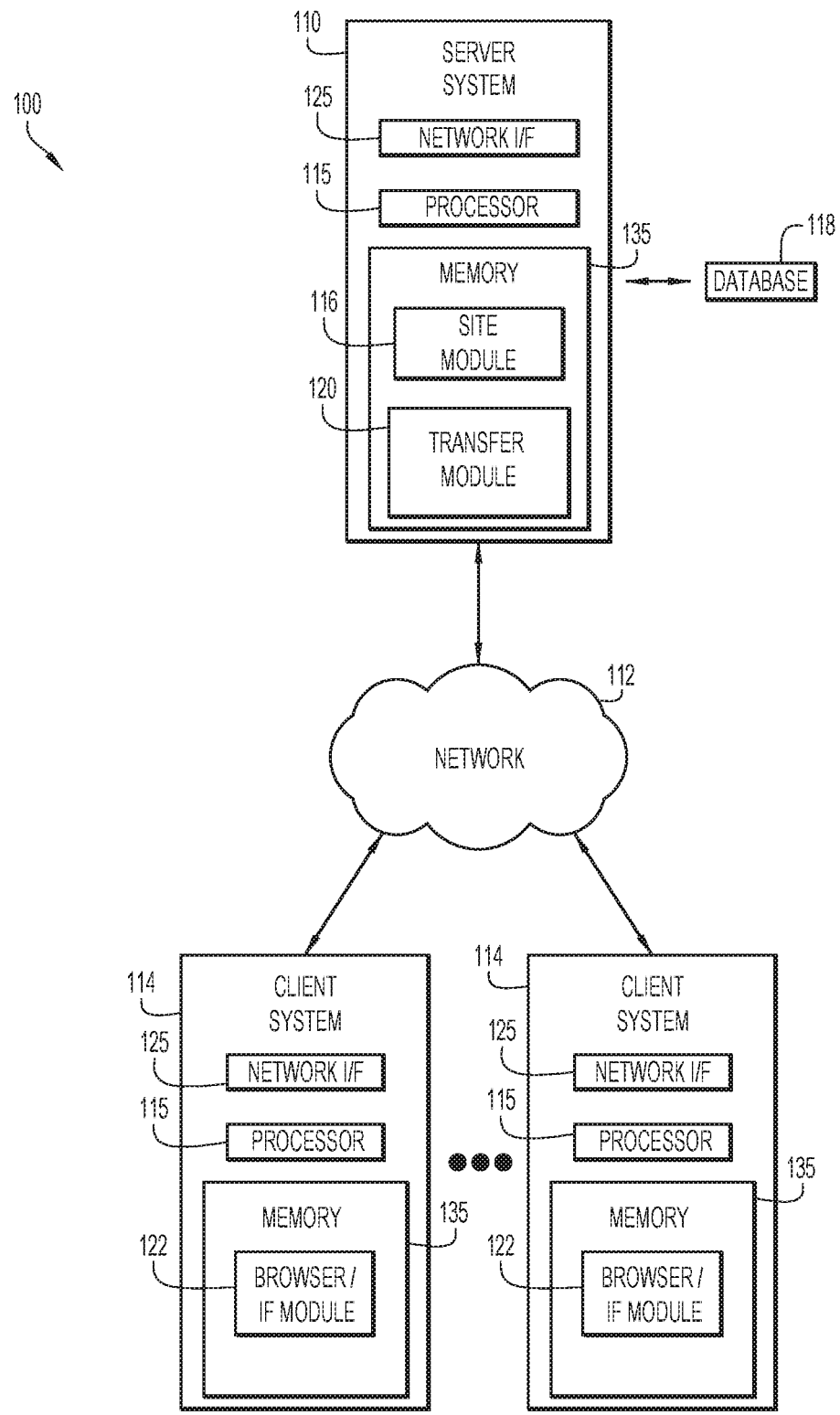
FIG. 1 is a diagrammatic illustration of an example computing environment according to an embodiment of the present invention.

An example computing environment of present invention embodiments is illustrated in FIG. 1. Specifically, computing environment 100 includes one or more server systems 110, and one or more client or end-user systems 114. Server systems 110 and client systems 114 may be remote from each other and communicate over a network 112. The network may be implemented by any number of any suitable communications media (e.g., wide area network (WAN), local area network (LAN), Internet, Intranet, etc.). Alternatively, server systems 110 and client systems 114 may be local to each other, and communicate via any appropriate local communication medium (e.g., local area network (LAN), hardwire, wireless link, Intranet, etc.).

Client systems 114 enable users to access a network or web site of server systems 110 to perform various interactions (e.g., perform transfers, such as those relating to inventory, purchases, payment of bills, banking, data transfer, communications, etc.) via a browser/interface module 122. The server systems include a site module 116 and a transfer module 120. The site module interacts with a user on client system 114 and conducts the various interactions of the network or web site (e.g., inventory, purchases, payment of bills, banking, data transfer, communications, etc.). The transfer module may be included within or coupled to site module 116, and enables transfer of items (e.g., physical items, data, etc.) between various combinations and quantities of source and destination nodes (e.g., relating to inventory, purchases, payment of bills, banking, data transfer, communications, etc.) as described below.

A database system 118 may store various information for the transfers (e.g., user information, location information, item information, financial account information, etc.). The database system may be implemented by any conventional or other database or storage unit, may be local to or remote from server systems 110 and client systems 114, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to solicit information from users pertaining to the desired interactions and other activities, and may provide reports including interaction or activity results (e.g., confirmations, receipts, etc.).

Server systems 110 and client systems 114 may be implemented by any conventional or other computer systems preferably equipped with a display or monitor, a base, optional input devices (e.g., a keyboard, mouse or other input device), and any commercially available and custom software (e.g., server/communications software, site module, transfer module, browser/interface module, etc.). The base preferably includes at least one hardware processor 115 (e.g., microprocessor, controller, central processing unit (CPU), etc.), one or more memories 135, and/or internal or external network interfaces or communications devices 125 (e.g., modem, network cards, etc.)).

The site, transfer, and browser/interface modules may include one or more modules or units to perform the various functions of present invention embodiments described below. The various modules (e.g., server/communications software, site module, transfer module, browser/interface module, etc.) may be implemented by any combination of any quantity of software and/or hardware modules or units, and may reside within memory 135 of the server and/or client systems for execution by a corresponding processor 115.

Figure 2:
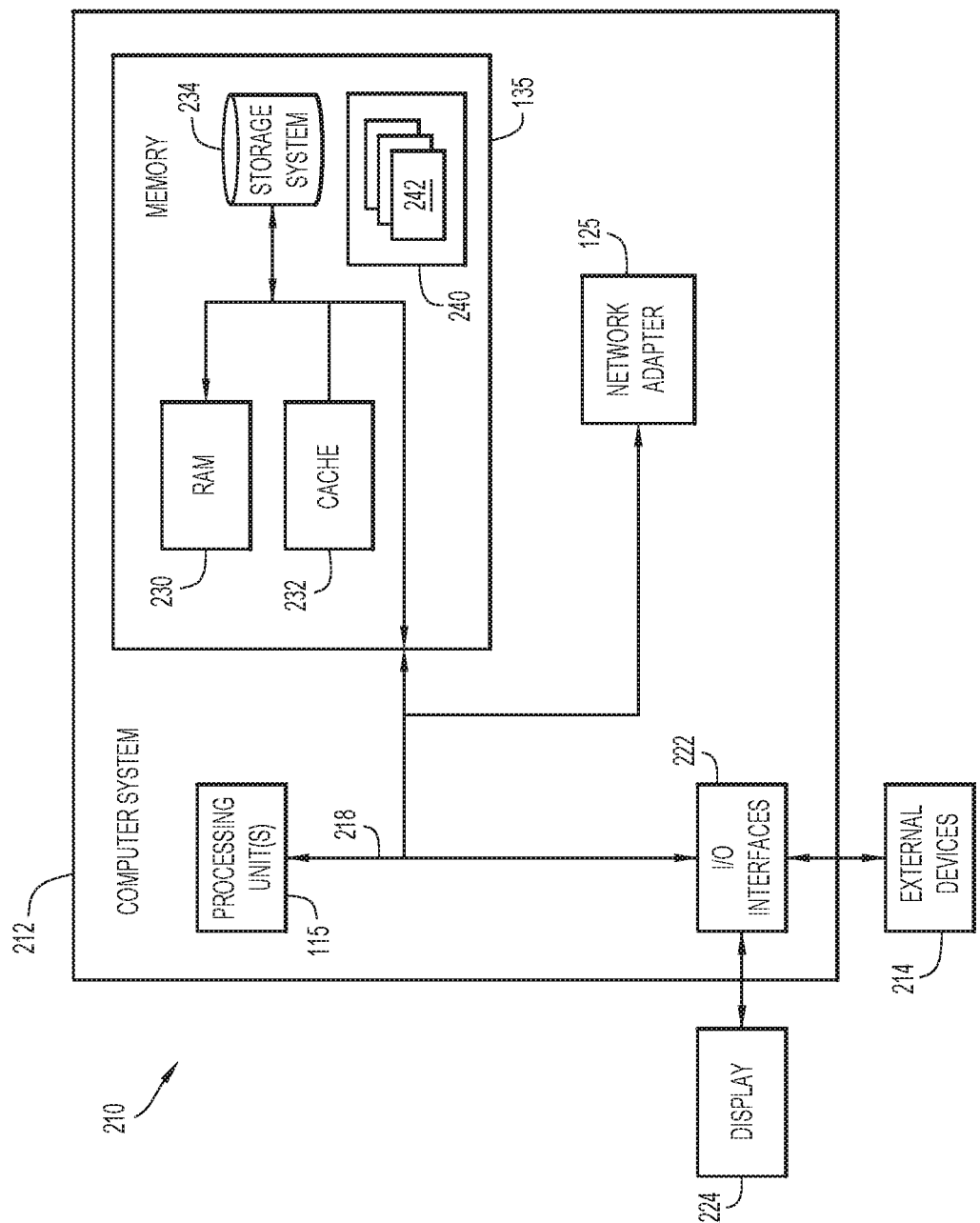
FIG. 2 is a block diagram of an example computing device according to an embodiment of the present invention.

Referring now to FIG. 2, a schematic of an example of a computing device 210 of computing environment 100 (e.g., implementing server system 110 and/or client system 114) is shown. The computing device is only one example of a suitable computing device for computing environment 100 and is not intended to suggest any limitation as to the scope of use or functionality of embodiments of the invention described herein. Regardless, computing device 210 is capable of being implemented and/or performing any of the functionality set forth herein.

In computing device 210, there is a computer system 212 which is operational with numerous other general purpose or special purpose computing system environments or configurations. Examples of well-known computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 2, computer system 212 is shown in the form of a general-purpose computing device. The components of computer system 212 may include, but are not limited to, one or more processors or processing units 115, system memory 135, and a bus 218 that couples various system components including system memory 135 to processor 115.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 135 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 135 may include at least one program product having a set (e.g., at least one) of program modules that are configured to carry out the functions of embodiments of the invention.

Program/utility 240, having a set (at least one) of program modules 242 (e.g., site module 116, transfer module 120, browser/interface module 122, etc.) may be stored in memory 135 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 125. As depicted, network adapter 125 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
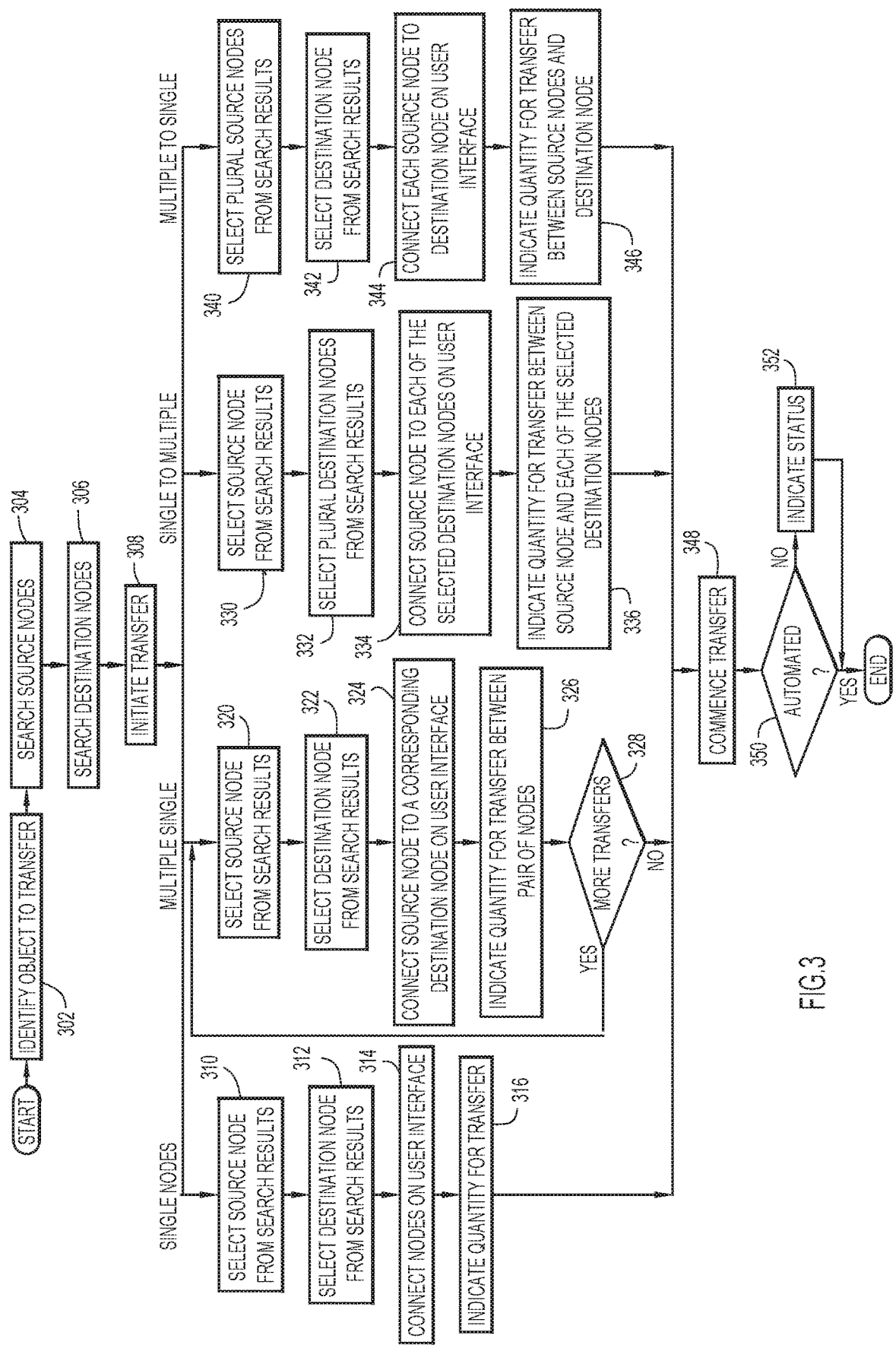
FIG. 3 is a procedural flowchart of a manner of transferring items between various combinations and quantities of source and destination nodes according to an embodiment of the present invention.

A manner of performing transfers between various combinations and quantities of source and destination nodes (e.g., via a server system 110 and a client system 114) according to an embodiment of the present invention is illustrated in FIG. 3. Initially, a user may utilize browser/interface module 122 of a client system 114 to access a web or other network site to perform a transfer of an item. The network site may perform various actions (e.g., via site module 116 and transfer module 120) pertaining to transfers of any types of objects or items (e.g., inventory, banking, data transfer, communications, etc.). The client system may present a user interface to enable interaction with the user (e.g., FIGS. 4-8) as described below.

An object to be transferred between source and destination nodes is identified at step 302. The object may be any of various items depending upon a particular scenario (e.g., physical items, numeric values or data, orders, etc.). For example, the item may relate to a good or product for an inventory system. In this case, the item may be selected from a search of inventory performed by transfer module 120 and selected from search results. By way of further example, items for financial systems may pertain to funds or monies to be transferred. Once the object is identified, a search of source nodes is performed by the transfer module at step 304 to produce source search results including source nodes containing the identified object. The search may be based on various parameters or criteria provided by a user (e.g., location, type of node/device, distances, amount of objects at a source node, etc.).

A search of destination nodes is performed by transfer module 120 at step 306 to produce destination search results including destination nodes to receive the objects from source nodes. The search may be based on various parameters or criteria provided by a user (e.g., location, type of node/device, distances, amount of objects at a destination node, etc.).

The source and destination nodes may be presented as graphical objects on the user interface to provide options for initiating various types of transfers at step 308. For example, a transfer between a single source node and a single destination node may be initiated by transfer module 120. In this case, a source node is selected from the source search results on the user interface at step 310, while a destination node is selected from the destination search results on the user interface at step 312. A graphical connector (e.g., line, arrow, etc.) is manipulated on the user interface to connect the selected source and destination nodes at step 314.

Once the source and destination nodes are connected on the user interface, a quantity of objects for the transfer (e.g., an amount of goods, funds, etc.) is indicated for the transfer at step 316. The graphical objects for the source and destination nodes may include quantity fields to indicate the current quantity for the node and quantity to be transferred. In addition, the destination node may include a quantity actuator to enable entry of the desired quantity for transfer.

Another type of transfer initiated by transfer module 120 at step 308 may include a transfer between plural source and destination node pairs. In this case, a source node is selected from the source search results on the user interface at step 320, while a destination node is selected from the destination search results on the user interface at step 322. A graphical connector (e.g., line, arrow, etc.) is manipulated on the user interface to connect the selected source and destination nodes at step 324.

Once the source and destination nodes are connected on the user interface, a quantity of objects for the transfer (e.g., an amount of goods, funds, etc.) is indicated for the transfer at step 326. The graphical objects for the source and destination nodes may include quantity fields to indicate the current quantity for the node and quantity to be transferred. In addition, the destination node may include a quantity actuator to enable entry of the desired quantity for transfer. The above operations (e.g., steps 320, 322, 324, and 326) may be repeated for additional transfers between a source and destination node pair as determined at step 328. Thus, the above operations enable transfers to be initiated between several pairs of source and destination nodes.

Yet another type of transfer initiated by transfer module 120 at step 308 may include a transfer between a source node and plural destination nodes. In this case, a source node is selected from the source search results on the user interface at step 330, while plural destination nodes are selected from the destination search results on the user interface at step 332. A graphical connector (e.g., line, arrow, etc.) is manipulated on the user interface to connect the selected source node to each of the selected destination nodes at step 334.

Once the source and destination nodes are connected on the user interface, a quantity of objects for each transfer (e.g., an amount of goods, funds, etc.) between the source node and a corresponding selected destination node is indicated for the transfer at step 336. The indicated quantities may be the same or different quantities for each of the transfers. The graphical objects for the source and destination nodes may include quantity fields to indicate the current quantity for the node and quantity to be transferred. The quantity field for the source node includes a plurality of quantity fields each indicating a quantity to be transferred to a corresponding selected destination node. In addition, the destination node may include a quantity actuator to enable entry of the desired quantity for transfer from the source node.

Still another type of transfer initiated by transfer module 120 at step 308 may include a transfer between plural source nodes and a destination node. In this case, plural source nodes are selected from the source search results on the user interface at step 340, while a destination node is selected from the destination search results on the user interface at step 342. A graphical connector (e.g., line, arrow, etc.) is manipulated on the user interface to connect each selected source node to the selected destination node at step 344.

Once the source and destination nodes are connected on the user interface, a quantity of objects for each transfer (e.g., an amount of goods, funds, etc.) between a selected source node and the destination node is indicated for the transfer at step 346. The graphical objects for the source and destination nodes may include quantity fields to indicate the current quantity for the node and quantity to be transferred. In addition, the destination node may include a quantity actuator to enable entry of the desired quantity for transfer from the source node. The quantity field for the destination node includes a plurality of quantity fields each indicating a quantity to be transferred from a corresponding selected source node.

When the source and destination nodes have been connected with the corresponding quantity indicated, the transfer is commenced at step 348. The transfer may further be validated prior to commencement, and invalid transfers may be indicated for modification. The validation may check various parameters or criteria (e.g., insufficient quantities to transfer, rules indicating valid transfers between source and destination nodes, rules indicating periods for transfers, etc.).

The transfer may be automated for certain transfers, such as funds, data, communications, etc. Alternatively, the transfer may include some physical processes, such as physically moving objects. When the transfer includes a physical component as determined at step 350, a status of the transfer is determined and indicated at step 352. The status may be indicated within the graphical objects of the corresponding source and/or destination nodes associated with the transfer. Physical transfers may be monitored through sensing devices coupled to the object or transporting device (e.g., RFID, GPS, scanning devices and corresponding codes/devices, etc.), and a status (e.g., real-time, periodic or other updates, updates as items are transferred between locations, etc.) of the progress of the transfer (e.g., initiated, completed, percentage or amount completed, etc.) may be provided.

The present invention embodiments may be utilized to provide any types of transfers between any combinations and quantities of source and destination nodes. Further, any quantity of the connectors of the user interface may be utilized to connect any quantity of source nodes to any quantity of destination nodes for various types of transfers (e.g., one to one, one to many, many to one, many to many, or any combinations thereof).

Figure 4:
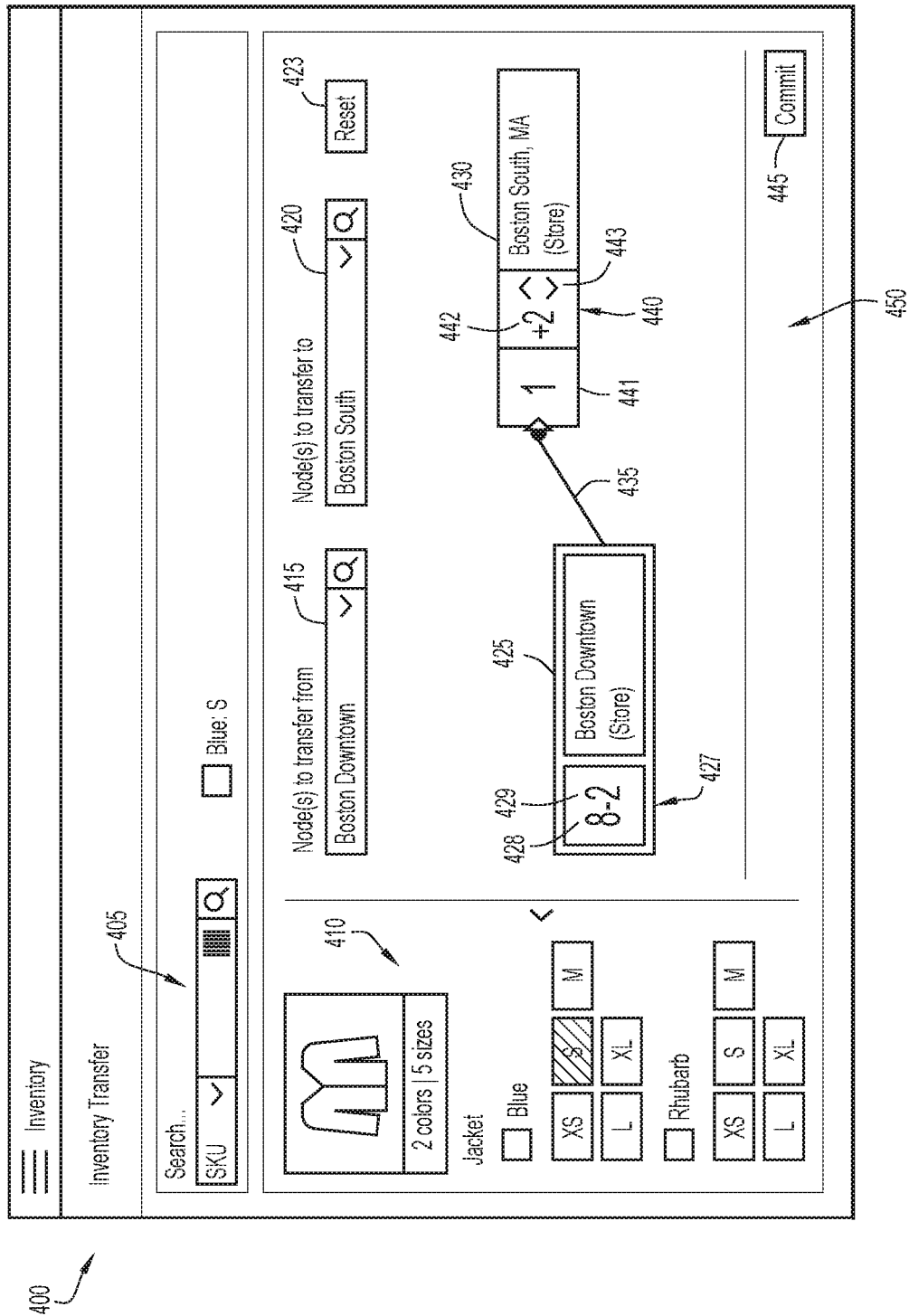
FIG. 4 is a schematic illustration of an example graphical user interface enabling a transfer between a source node and a destination node according to an embodiment of the present invention.

Operation of an embodiment of the present invention for enabling transfers between different combinations of source and destination nodes is described. By way of example, an embodiment of the present invention may include an inventory system that enables transfers between a single source node and a single destination node as illustrated in FIG. 4 (e.g., corresponding to the single nodes transfer from step 308 of FIG. 3). Initially, the inventory system may provide a user interface screen 400 that includes an object search section 405, an object section 410, a source search section 415, a destination search section 420, and a transfer section or area 450. A search for an object or item of inventory to be transferred may be performed based on criteria (e.g., identifiers, categories, types, keywords, etc.) entered into object search section 405. A selected object may be displayed in object section 410 with corresponding characteristics. For example, the object may be a jacket with corresponding sizes and colors as viewed in FIG. 4.

Once the object and characteristics are selected (e.g., a blue jacket of a small size as viewed in FIG. 4), a search of source nodes is performed by entering criteria in source search section 415. The search may be based on various parameters or criteria provided by a user (e.g., location, type of node/device, distances, amount of objects at a source node (e.g., high or low inventory), etc.). The source search section may include a drop-down box or list (e.g., FIG. 6) to enable selection of one or more criteria for the search (e.g., location, inventory (e.g., high or low inventory), show all nodes, etc.). The search produces one or more source nodes 425 containing the selected object based on the search criteria. The resulting source nodes are presented as graphical objects in transfer area 450 of user interface screen 400. The source graphical objects include a description of the node (e.g., location or other identifier) and quantity field 427 indicating a total quantity of the node 428 and a desired quantity for the transfer 429.

A search of destination nodes is performed by entering criteria in destination search section 420. The search may be based on various parameters or criteria provided by a user (e.g., location, type of node/device, distances, amount of objects at a destination node (e.g., high or low inventory), etc.). The destination search section may include a drop-down box or list (e.g., FIG. 6) to enable selection of one or more criteria for the search (e.g., location, inventory (e.g., high or low inventory), show all nodes, etc.).

The search produces one or more destination nodes 430 that are presented as graphical objects in transfer area 450 of user interface screen 400. The destination graphical objects include a description of the node (e.g., location or other identifier), a quantity field 440 indicating a total quantity of the node 441, a desired quantity for the transfer 442, and a quantity actuator 443 (e.g., increment and decrement arrows, etc.) to indicate a quantity for the transfer. The searches may be reset based on actuation of reset actuator 423. The transfer area provides an overall view or landscape of source and destination nodes and corresponding inventory to present various options for transfer of the items.

A source node and destination node for the transfer are selected from transfer area 450 and a graphical connector 435 (e.g., line, arrow, etc.) is manipulated on the user interface screen to connect the selected source and destination nodes. A transfer may be cancelled by removing or deleting the graphical connector between source and destination nodes on user interface screen 400. A quantity of objects for the transfer (e.g., two jackets as viewed in FIG. 4) is indicated for the transfer via manipulation of quantity actuator 443. The quantity fields 427 and 440 of the selected source and destination nodes are updated based on the indicated quantity, and the transfer is initiated based on actuation of commit actuator 445. The transfer may further be validated prior to commencement, and invalid transfers may be indicated for modification as described above. In this example case, two blue jackets of the small size are being transferred from source node 425 (e.g., Boston Downtown) having eight blue jackets of the small size to destination node 430 (e.g., Boston South) having a single blue jacket of the small size.

Figure 5:
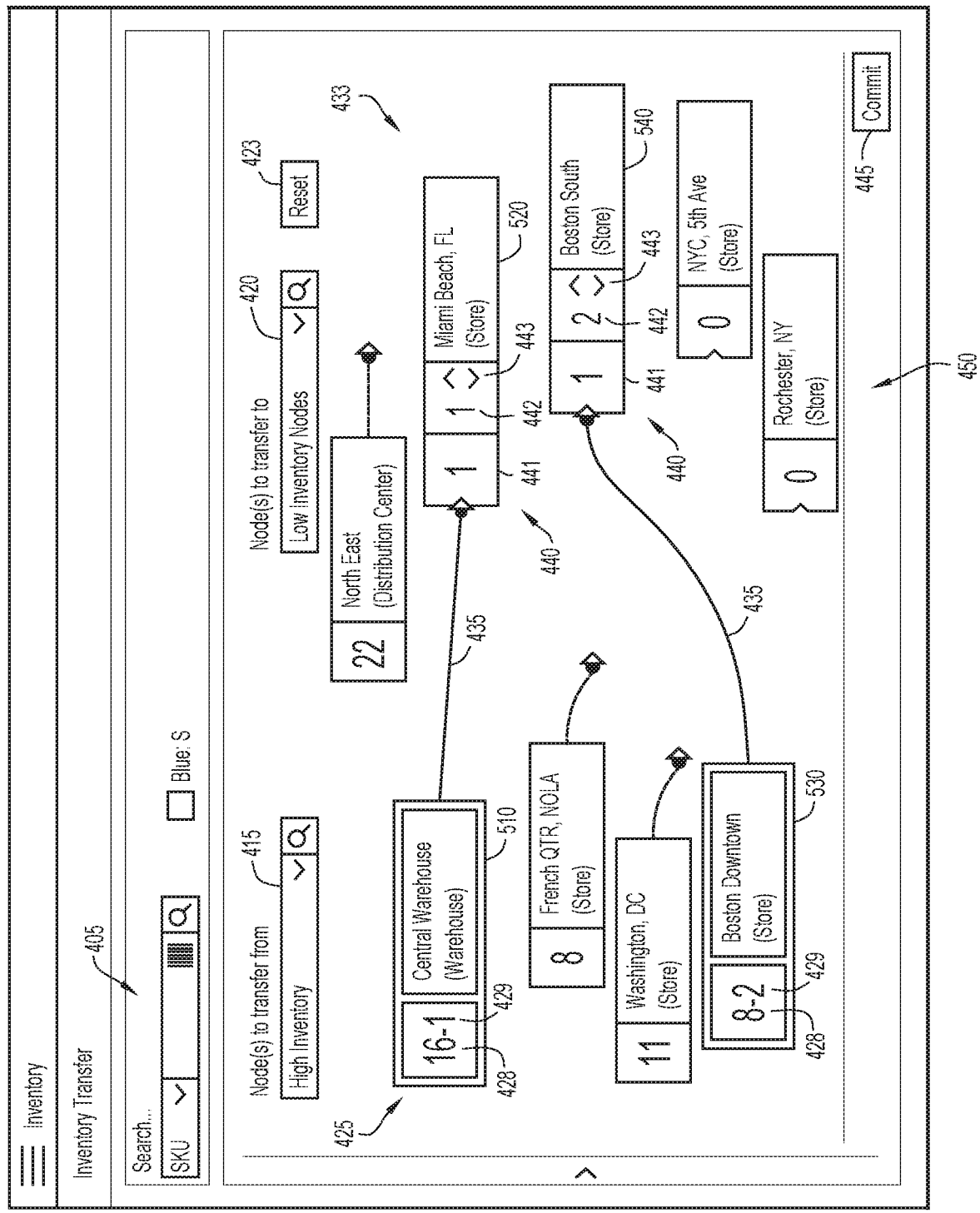
FIG. 5 is a schematic illustration of an example graphical user interface enabling a transfer between a plurality of source and destination node pairs according to an embodiment of the present invention.

The example inventory system of a present invention embodiment may further enable transfers between plural source and destination node pairs as illustrated in FIG. 5 (e.g., corresponding to the multiple single transfer from step 308 of FIG. 3). Initially, the inventory system may provide a user interface screen 500 substantially similar to user interface screen 400 described above. User interface screen 500 includes object search section 405, source search section 415, destination search section 420, and transfer section or area 450. A search for the object or item of inventory (e.g., blue jacket of small size) may be performed as described above. A search of source nodes is performed by entering criteria in source search section 415. The search may be based on various parameters or criteria provided by a user (e.g., location, type of node/device, distances, amount of objects at a source node (e.g., high or low inventory), etc.). The source search section may include a drop-down box or list (e.g., FIG. 6) to enable selection of one or more criteria for the search (e.g., location, inventory (e.g., high or low inventory), show all nodes, etc.). The search produces one or more source nodes 425 containing the identified object based on the search criteria. The resulting source nodes are presented as graphical objects in transfer area 450 of user interface screen 500. Each source graphical object includes a description of the node (e.g., location or other identifier) and quantity field 427 indicating a total quantity of the node 428 and a desired quantity for transfer 429.

A search of destination nodes is performed by entering criteria in destination search section 420. The search may be based on various parameters or criteria provided by a user (e.g., location, type of node/device, distances, amount of objects at a destination node (e.g., high or low inventory), etc.). The destination search section may include a drop-down box or list (e.g., FIG. 6) to enable selection of one or more criteria for the search (e.g., location, inventory (e.g., high or low inventory), show all nodes, etc.). The search produces one or more destination nodes 430 that are presented as graphical objects in transfer area 450 of user interface screen 500. Each destination graphical object includes a description of the node (e.g., location or other identifier), a quantity field 440 indicating a total quantity of the node 441, a desired quantity for the transfer 442, and a quantity actuator 443 (e.g., increment and decrement arrows, etc.) to indicate a quantity for the transfer. The searches may be reset based on actuation of reset actuator 423. The transfer area provides an overall view or landscape of source and destination nodes and corresponding inventory to present various options for transfer of the items.

Source nodes 510, 520 and destination nodes 520, 540 for the transfers are selected from transfer area 450 and graphical connectors 435 (e.g., line, arrow, etc.) are manipulated on the user interface screen to connect the selected source and destination nodes. In this case, a transfer occurs between source node 510 and destination node 520, and source node 530 and destination node 540. A transfer may be cancelled by removing or deleting the graphical connector between source and destination nodes on user interface screen 500. A quantity of objects for each transfer (e.g., one jacket for nodes 510, 520; and two jackets for nodes 530, 540 as viewed in FIG. 4) is indicated for the transfers via manipulation of quantity actuator 443 of destination nodes 520, 540. The quantity fields 427 and 440 of the selected source and destination nodes are updated based on the indicated quantities, and the transfers are initiated based on actuation of commit actuator 445. The transfer may further be validated prior to commencement, and invalid transfers may be indicated for modification as described above. In this example case, one blue jacket of the small size is being transferred from source node 510 (e.g., Central Warehouse) having sixteen blue jackets of the small size to destination node 520 (e.g., Miami Beach, Fla.) having a single blue jacket of the small size, and two blue jackets of the small size are being transferred from source node 530 (e.g., Boston Downtown) having eight blue jackets of the small size to destination node 540 (e.g., Boston South) having a single blue jacket of the small size.

Figure 6:
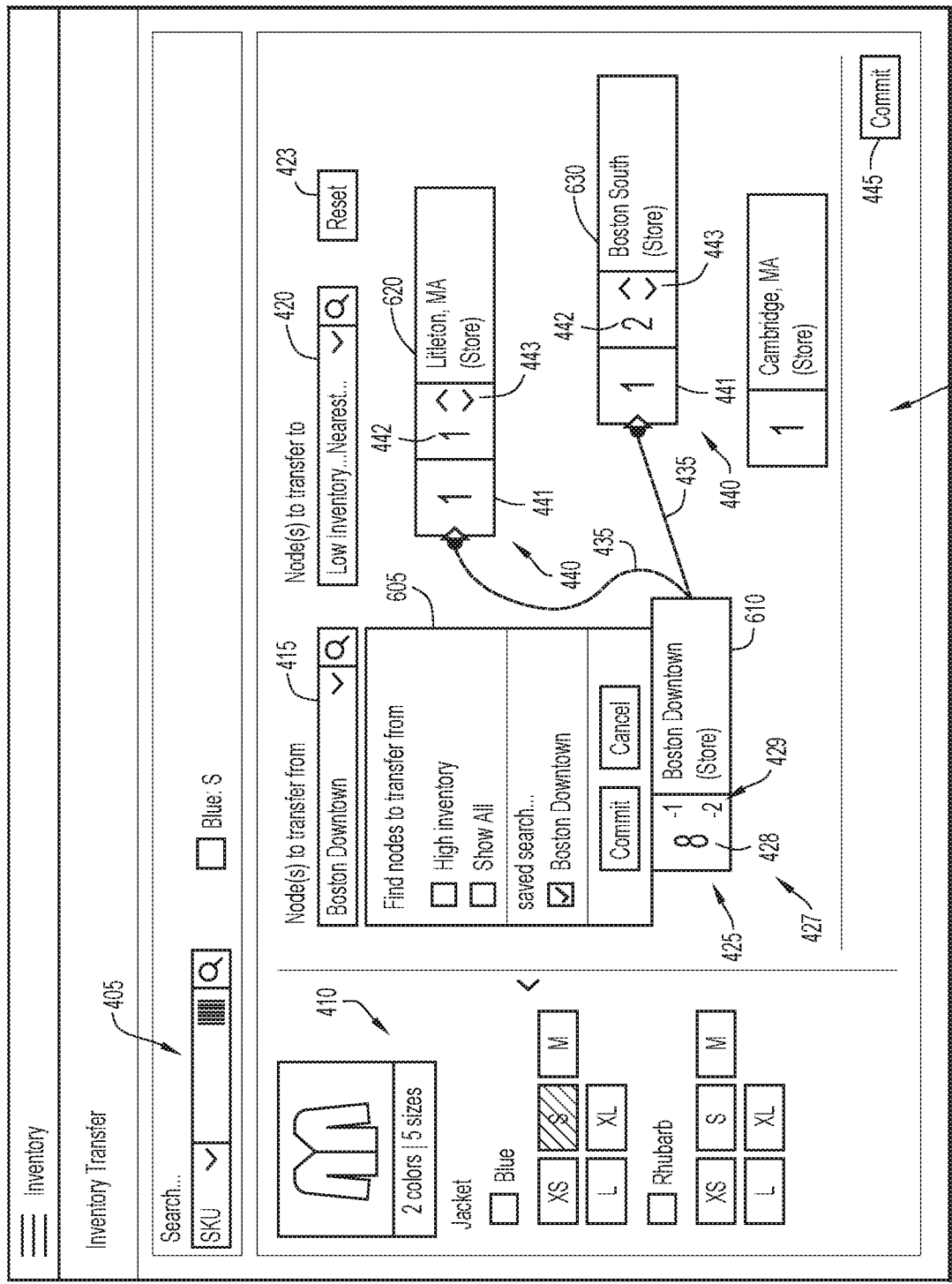
FIG. 6 is a schematic illustration of an example graphical user interface enabling a transfer between a source node and plural destination nodes according to an embodiment of the present invention.

The example inventory system of a present invention embodiment may also enable transfers between a single source node and plural destination nodes as illustrated in FIG. 6 (e.g., corresponding to the single to multiple transfer from step 308 of FIG. 3). Initially, the inventory system may provide a user interface screen 600 substantially similar to user interface screen 400 described above. User interface screen 600 includes object search section 405, object section 410, source search section 415, destination search section 420, and transfer section or area 450. A search for the object or item of inventory (e.g., blue jacket of small size) may be performed as described above. A search of source nodes is performed by entering criteria in source search section 415. The search may be based on various parameters or criteria provided by a user (e.g., location, type of node/device, distances, amount of objects at a source node (e.g., high or low inventory), etc.). The source search section may include a drop-down box or list (e.g., as viewed in FIG. 6) to enable selection of one or more criteria for the search (e.g., location, inventory (e.g., high or low inventory), show all nodes, etc.). The search produces one or more source nodes 425 containing the identified object based on the search criteria. The resulting source nodes are presented as graphical objects in transfer area 450 of user interface screen 600. Each source graphical object includes a description of the node (e.g., location or other identifier) and quantity field 427 indicating a total quantity of the node 428 and a desired quantity for transfer 429. The desired quantity may include desired quantities for each corresponding destination node of the transfer.

A search of destination nodes is performed by entering criteria in destination search section 420. The search may be based on various parameters or criteria provided by a user (e.g., location, type of node/device, distances, amount of objects at a destination node (e.g., high or low inventory), etc.). The destination search section may include a drop-down box or list (e.g., as viewed in FIG. 6) to enable selection of one or more criteria for the search (e.g., location, inventory (e.g., high or low inventory), show all nodes, etc.). The search produces one or more destination nodes 430 that are presented as graphical objects in transfer area 450 of user interface screen 600. Each destination graphical object includes a description of the node (e.g., location or other identifier), a quantity field 440 indicating a total quantity of the node 441, a desired quantity for the transfer 442, and a quantity actuator 443 (e.g., increment and decrement arrows, etc.) to indicate a quantity for the transfer. The searches may be reset based on actuation of reset actuator 423. The transfer area provides an overall view or landscape of source and destination nodes and corresponding inventory to present various options for transfer of the items.

A source node 610 and destination nodes 620, 630 for the transfer are selected from transfer area 450 and graphical connectors 435 (e.g., line, arrow, etc.) are manipulated on the user interface screen to connect the selected source and destination nodes. A transfer may be cancelled by removing or deleting the graphical connector between source and destination nodes on user interface screen 600. A quantity of objects for each transfer (e.g., one jacket between nodes 610 and 620; and 2 jackets between nodes 610 and 630 as viewed in FIG. 6) are indicated for the transfer via manipulation of quantity actuators 443 of the corresponding destination nodes. The quantity fields 427 and 440 of the selected source and destination nodes are updated based on the indicated quantity, and the transfers are initiated based on actuation of commit actuator 445. The transfer may further be validated prior to commencement, and invalid transfers may be indicated for modification as described above. In this example case, one blue jacket of the small size is being transferred from source node 610 (e.g., Boston Downtown) having eight blue jackets of the small size to destination node 620 (e.g., Littleton, Mass.) having a single blue jacket of the small size, and two blue jackets of the small size are being transferred from source node 610 (e.g., Boston Downtown) having eight blue jackets of the small size to destination node 630 (e.g., Boston South) having a single blue jacket of the small size.

Figure 7:
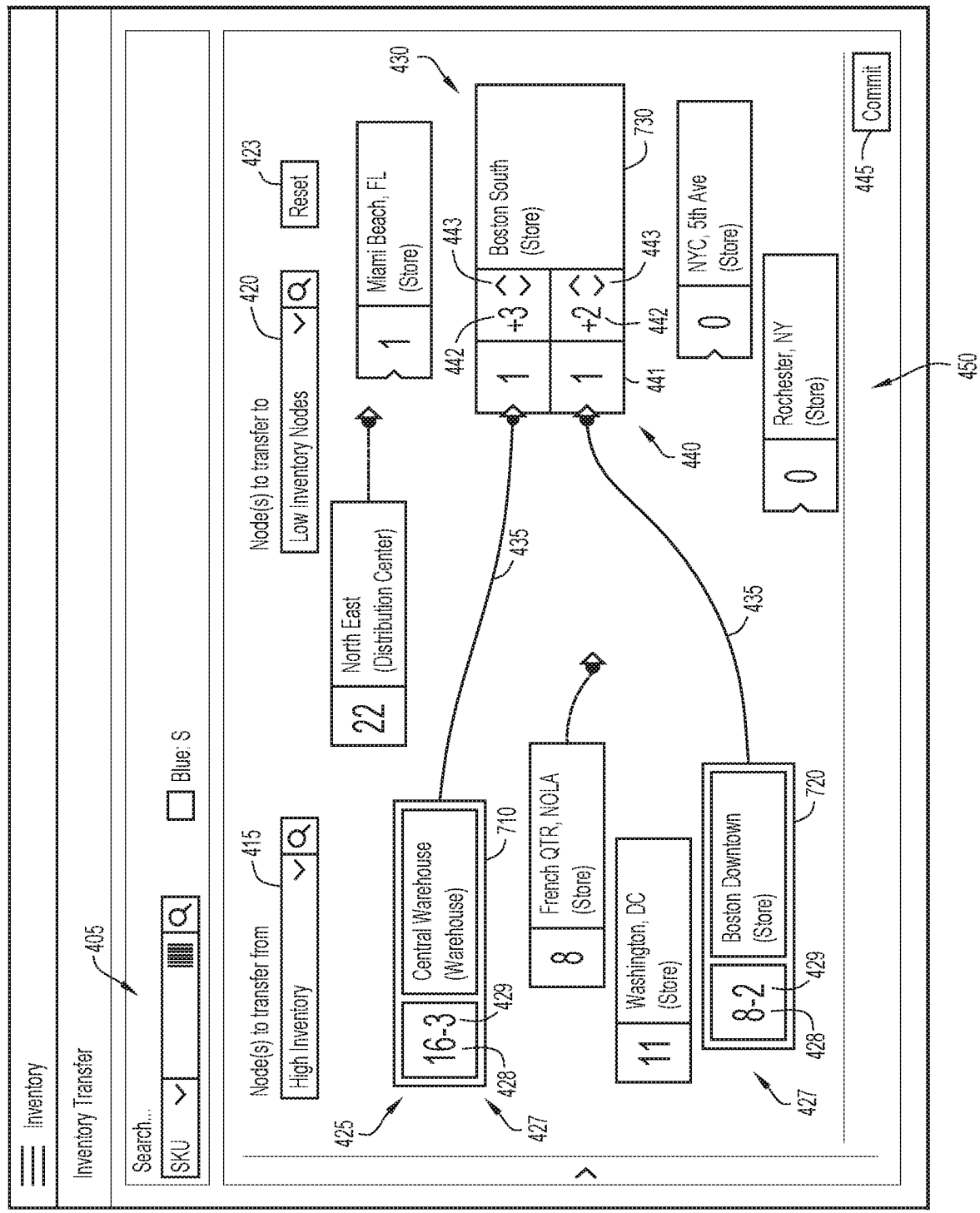
FIG. 7 is a schematic illustration of an example graphical user interface enabling a transfer between plural source nodes and a destination node according to an embodiment of the present invention.

In addition, the example inventory system of a present invention embodiment may enable transfers between plural source nodes and a destination node as illustrated in FIG. 7 (e.g., corresponding to the multiple to single transfer from step 308 of FIG. 3). Initially, the inventory system may provide a user interface screen 700 substantially similar to user interface screen 400 described above. User interface screen 700 includes object search section 405, source search section 415, destination search section 420, and transfer section or area 450. A search for the object or item of inventory (e.g., blue jacket of small size) may be performed as described above. A search of source nodes is performed by entering criteria in source search section 415. The search may be based on various parameters or criteria provided by a user (e.g., location, type of node/device, distances, amount of objects at a source node (e.g., high or low inventory), etc.). The source search section may include a drop-down box or list (e.g., FIG. 6) to enable selection of one or more criteria for the search (e.g., location, inventory (e.g., high or low inventory), show all nodes, etc.). The search produces one or more source nodes 425 containing the identified object based on the search criteria. The resulting source nodes are presented as graphical objects in transfer area 450 of user interface screen 700. Each source graphical object includes a description of the node (e.g., location or other identifier) and quantity field 427 indicating a total quantity of the node 428 and a desired quantity for transfer 429.

A search of destination nodes is performed by entering criteria in destination search section 420. The search may be based on various parameters or criteria provided by a user (e.g., location, type of node/device, distances, amount of objects at a destination node (e.g., high or low inventory), etc.). The destination search section may include a drop-down box or list (e.g., FIG. 6) to enable selection of one or more criteria for the search (e.g., location, inventory (e.g., high or low inventory), show all nodes, etc.). The search produces one or more destination nodes 430 that are presented as graphical objects in transfer area 450 of user interface screen 700. Each destination graphical object includes a description of the node (e.g., location or other identifier), a quantity field 440 indicating a total quantity of the node 441, a desired quantity for the transfer 442, and a quantity actuator 443 (e.g., increment and decrement arrows, etc.). The desired quantity for a destination node receiving items from plural source nodes may include desired quantities for each corresponding source node of the transfer. The searches may be reset based on actuation of reset actuator 423. The transfer area provides an overall view or landscape of source and destination nodes and corresponding inventory to present various options for transfer of the items.

Source nodes 710, 720 and destination node 730 for the transfer are selected from transfer area 450 and graphical connectors 435 (e.g., line, arrow, etc.) are manipulated on the user interface screen to connect the selected source and destination nodes. A transfer may be cancelled by removing or deleting the graphical connector between source and destination nodes on user interface screen 700. A quantity of objects for each transfer (e.g., three jackets between nodes 710 and 730; and 2 jackets between nodes 720 and 730 as viewed in FIG. 7) are indicated for the transfer via quantity actuators 443 of the corresponding destination node. In this case, destination node 730 includes a quantity actuator 443 for each corresponding source node providing items for the transfer. The quantity fields 427 and 440 of the selected source and destination nodes are updated based on the indicated quantity, and the transfers are initiated based on actuation of commit actuator 445. The transfer may further be validated prior to commencement, and invalid transfers may be indicated for modification as described above. In this example case, three blue jackets of the small size are being transferred from source node 710 (e.g., Central Warehouse) having sixteen blue jackets of the small size to destination node 730 (e.g., Boston South, Mass.) having a single blue jacket of the small size, and two blue jackets of the small size are being transferred from source node 720 (e.g., Boston Downtown) having eight blue jackets of the small size to destination node 730 (e.g., Boston South) having a single blue jacket of the small size.

Figure 8:
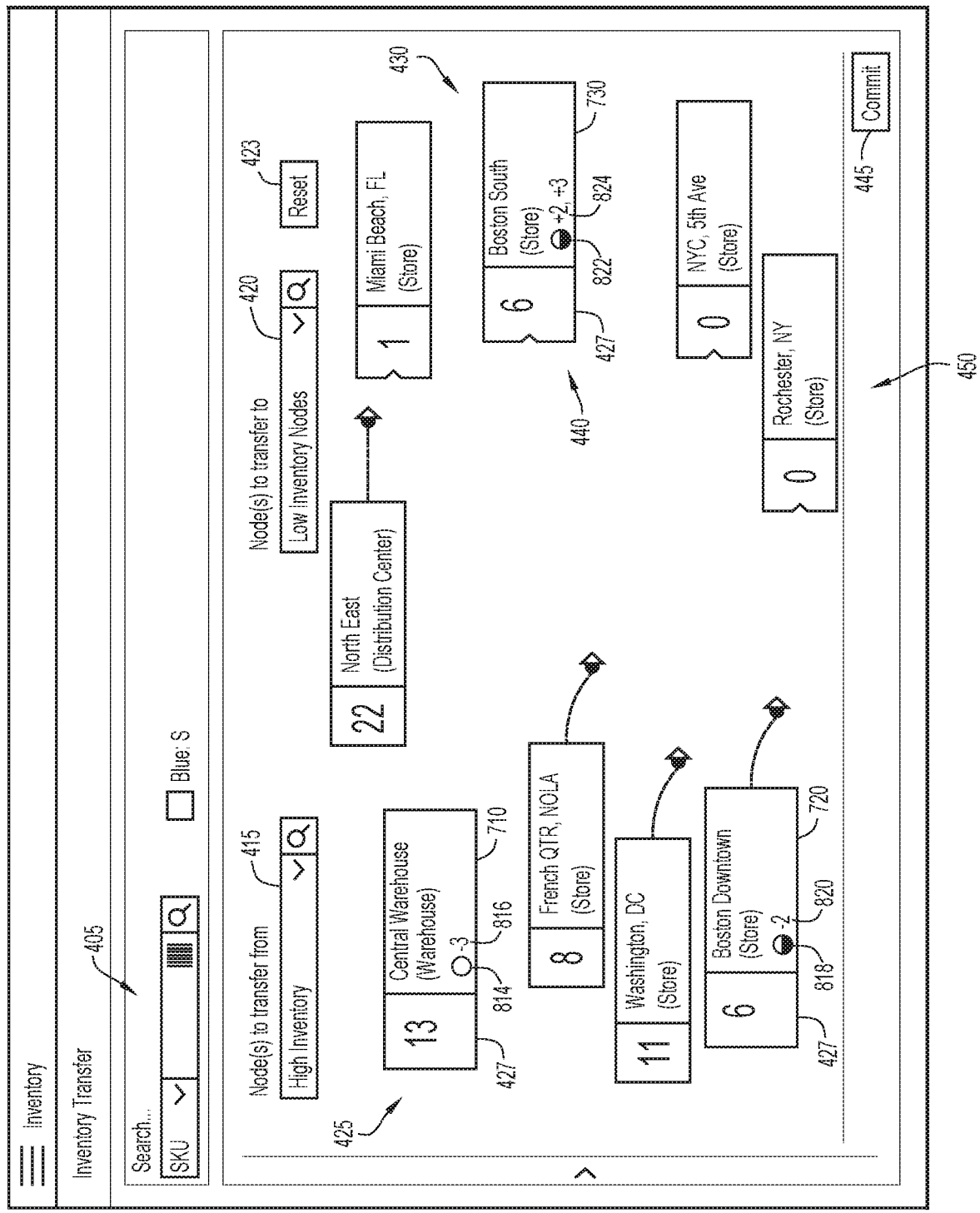
FIG. 8 is a schematic illustration of an example graphical user interface providing a status indicator for a transfer between plural source nodes and a destination node according to an embodiment of the present invention.

The transfers of the inventory system may include physical processes. For example, a delivery service may be needed to physically transport or deliver the items from the source nodes to the destination nodes. Accordingly, the example inventory system of a present invention embodiment may provide a status of the transfer as illustrated in FIG. 8. Initially, the inventory system may provide a user interface screen 800 substantially similar to user interface screen 700 described above. User interface screen 800 includes object search section 405, source search section 415, destination search section 420, and transfer section or area 450. By way of example, user interface screen 800 represents the initiation of the transfer illustrated in FIG. 7. This transfer encompasses three blue jackets of the small size being transferred from source node 710 (e.g., Central Warehouse) having sixteen blue jackets of the small size to destination node 730 (e.g., Boston South, Mass.) having a single blue jacket of the small size, and two blue jackets of the small size being transferred from source node 720 (e.g., Boston Downtown) having eight blue jackets of the small size to destination node 730 (e.g., Boston South) having a single blue jacket of the small size.

Once the transfer is initiated, the process may be monitored in various manners through sensing devices coupled to the object or transporting device (e.g., RFID, GPS, scanning devices and corresponding codes/devices, etc.), and a status (e.g., real-time, periodic or other updates, updates as items are transferred between locations, etc.) of the progress of the transfer (e.g., initiated, completed, percentage or amount completed, etc.) may be indicated. For example, location (e.g., GPS) or other sensors may track movement of the jackets from each source node to the destination node. Further, the jackets may be scanned at the source and/or destination nodes to indicate departure and/or arrival.

The graphical object representing source node 710 may include a status indicator 814 and a quantity indicator 816. The status indicator may be of any symbol to indicate a status or progress of the transfer from that source node. By way of example, status indicator 814 may be in the form of a circle, with incremental shading or filling of the circle indicating progress of the transfer based on the monitored information (e.g., a completely shaded or filled circle indicates completion of the transfer, a partially shaded or filled circle indicates a corresponding percentage of completion of the transfer, etc.). Quantity indicator 816 indicates a quantity of items being transferred (e.g., three items being transferred). In addition, quantity indicator 427 of source node 710 may be updated to reflect the transfer (e.g., sixteen jackets decremented by three jackets of the transfer).

The graphical object representing source node 720 may include a status indicator 818 and a quantity indicator 820. The status indicator may be of any symbol to indicate a status or progress of the transfer from that source node. By way of example, status indicator 820 may be in the form of a circle, with incremental shading or filling of the circle indicating progress of the transfer based on the monitored information (e.g., a completely shaded or filled circle indicates completion of the transfer, a partially shaded or filled circle indicates a corresponding percentage of completion of the transfer, etc.). Quantity indicator 820 indicates a quantity of items being transferred (e.g., two items being transferred). In addition, quantity indicator 427 of source node 720 may be updated to reflect the transfer (e.g., eight jackets decremented by two jackets of the transfer).

The graphical object representing destination node 730 may include a status indicator 822 and a quantity indicator 824. The status indicator may be of any symbol to indicate a status or progress of the transfer from a corresponding source node. By way of example, status indicator 822 may be in the form of a circle, with incremental shading or filling of the circle indicating progress of the transfer based on the monitored information (e.g., a completely shaded or filled circle indicates completion of the transfer, a partially shaded or filled circle indicates a corresponding percentage of completion of the transfer, etc.). Quantity indicator 824 indicates a quantity of items being transferred from each source node (e.g., two items being transferred from source node 710 and three items being transferred source node 710). In addition, quantity indicator 440 of destination node 730 may be updated to reflect the transfers (e.g., one jacket incremented by five total jackets of the transfers).

The source and destination nodes may include any quantity of status indicators based on the selected transfers. For example, a source node transferring items to plural destination nodes may include a status indicator for each of the transfers, while a destination node receiving items from plural source nodes may include a status indicator for each of the transfers. In addition, a status indicator may be provided to indicate overall progress for source and/or destination nodes participating in plural transfers (e.g., single to many, many to single, many to many, etc.).

By way of further example, an embodiment of the present invention may include an example funds transfer system that may enable transfers between various combinations and quantities of source and destination nodes in substantially the same manner described above. Initially, conventional online banking systems enable transfer of funds between bank accounts. These are usually performed from a user interface that initiates transactions limited to transferring funds from a single source account to a single destination account. However, a complex transfer may include multiple transactions transferring funds between multiple accounts. In order to perform the complex transfer on the user interface, the complex transfer is decomposed into several transfers each between a single source account and a single destination account. These transfers may be individually entered and serially initiated from the user interface. For example, a complex transfer may require a funds transfer from a same account to two different destination accounts. In this case, the complex transfer is decomposed into a first transaction between the source account and the first destination account and a second transaction between the source account and the second destination account. The first and second transactions would be individually entered and initiated in a serial fashion on the user interface to perform the complex transfer.

The funds transfer system of a present invention embodiment enables transfers between various combinations and quantities of accounts, and may provide a user interface screen 900 substantially similar to the user interface screens described above. User interface screen 900 includes a source search section 915, a destination search section 920, and a transfer section or area 950.

A search of source nodes is performed by entering criteria in source search section 915. The search may be based on various parameters or criteria provided by a user (e.g., location, type of node/account, amount of funds (e.g., high or low balance), etc.). The source search section may include a drop-down box or list (e.g., FIG. 6) to enable selection of one or more criteria for the search (e.g., location, funds (e.g., high or low balance), show all nodes, etc.). The search produces one or more source nodes 925 satisfying the search criteria. The resulting source nodes are presented as graphical objects in transfer area 950 of user interface screen 900. The source graphical objects include a description of the node (e.g., location or other identifier) and quantity field 927 indicating a total quantity of the node 928 and a desired quantity for the transfer 929.

A search of destination nodes is performed by entering criteria in destination search section 920. The search may be based on various parameters or criteria provided by a user (e.g., location, type of node/device, distances, amount of funds at a destination node (e.g., high or low balance), etc.). The destination search section may include a drop-down box or list (e.g., FIG. 6) to enable selection of one or more criteria for the search (e.g., location, funds (e.g., high or low balance), show all nodes, etc.). The search produces one or more destination nodes 930 that are presented as graphical objects in transfer area 950 of user interface screen 900.

The destination graphical objects include a description of the node (e.g., location or other identifier), a quantity field 940 indicating a total quantity of the node 941, a desired quantity for the transfer 942, and a quantity actuator 943 (e.g., increment and decrement arrows, etc.) to indicate a quantity for the transfer. The desired quantity for a destination node receiving funds from plural source nodes may include desired quantities for each corresponding source node of the transfer. The searches may be reset based on actuation of reset actuator 923. The transfer area provides an overall view or landscape of source and destination nodes and corresponding funds to present various options for transfer of the items.

Figure 9:
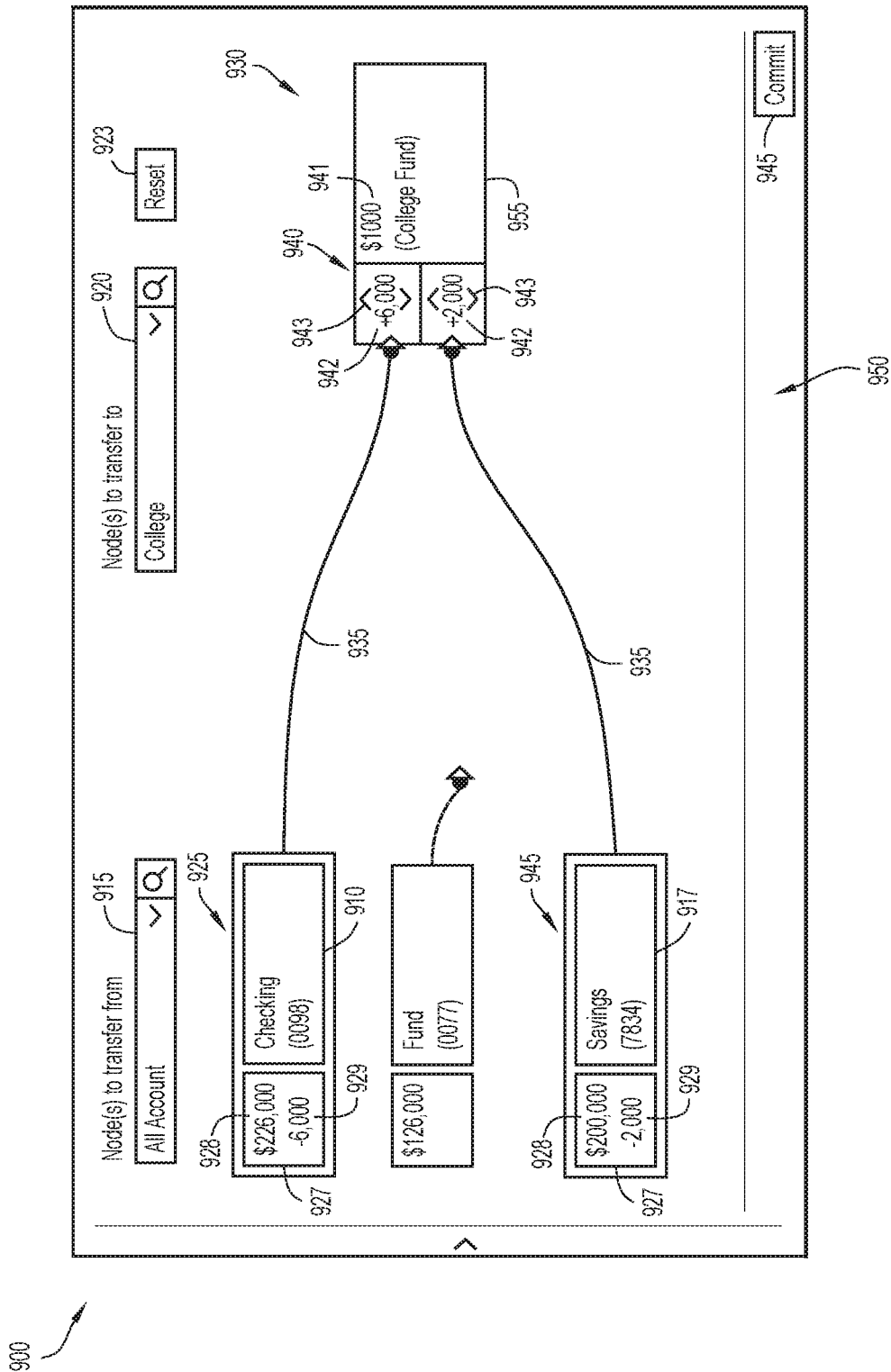
FIG. 9 is a schematic illustration of an example graphical user interface enabling a transfer between plural source financial accounts and a destination financial account according to an embodiment of the present invention.

By way of example, source nodes 910, 917 and destination node 955 for the transfer are selected from transfer area 950 and graphical connectors 935 (e.g., line, arrow, etc.) are manipulated on the user interface screen to connect the selected source and destination nodes. A transfer may be cancelled by removing or deleting the graphical connector between source and destination nodes on user interface screen 900. A quantity of funds for each transfer (e.g., $6,000 between nodes 910 and 955; and $2,000 between nodes 917 and 955 as viewed in FIG. 9) are indicated for the transfer via manipulation of quantity actuators 943 of the corresponding destination node. In this case, destination node 955 includes a quantity actuator 943 for each corresponding source node providing items for the transfer. The quantity fields 927 and 940 of the selected source and destination nodes are updated based on the indicated quantity, and the transfers are initiated based on actuation of commit actuator 945. The transfer may further be validated prior to commencement, and invalid transfers may be indicated for modification as described above. The validation may check various parameters or criteria (e.g., insufficient quantities to transfer, rules indicating valid transfers between source and destination nodes, rules indicating periods for transfers, etc.). In this example case, $6,000 is being transferred from source node 910 (e.g., Checking) having a balance of $226,000 to destination node 955 (e.g., College Fund) having a balance of $1,000, and $2,000 is being transferred from source node 917 (e.g., Savings) having a balance of $200,000 to destination node 955 (e.g., College) having a balance of $1,000. However, the funds transfer system may perform any of the transfers described above utilizing any combinations and quantities of source and destination nodes.

It will be appreciated that the embodiments described above and illustrated in the drawings represent only a few of the many ways of implementing embodiments for transfer between different combinations of source and destination nodes.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser/interface software, communications software, server software, site module, transfer module, etc.). These systems may include any types of monitors and input devices (e.g., keyboard, mouse, voice recognition, etc.) to enter and/or view information.

It is to be understood that the software (e.g., site module, transfer module, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., site module, transfer module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., user information, location information, item information, financial account information, etc.). The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., search criteria, transfer information, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., confirmations, receipts, etc.).

The present invention embodiments are not limited to the specific tasks or algorithms described above, but may be utilized for any types of transfers of any objects or items between any combinations and quantities of any source and destination nodes (e.g., one to one, one to many, many to one, many to many, or any quantities or combinations thereof). The source and destination nodes may be represented by any graphical objects of any shape or size (e.g., circle, polygon, symbol, etc.), and may include any desired information (e.g., identifiers, quantities, etc.). The graphical objects may be generated (e.g., utilizing visualization layers overlaid with the user interface, etc.) in response to a search for the source and destination nodes. The connector may be of any quantity, may be represented by any graphical objects of any shape or size (e.g., arrow, one or more lines, polygons, etc.), and may be manipulated by a user or the system to connect any desired source and destination nodes. The graphical connector may be generated utilizing visualization layers overlaid with the user interface. The quantity actuator may include any type of actuator to increment, decrement or enable entry of a desired quantity by a user or the system. The transfers may be validated based on any desired conditions or rules (e.g., sufficient quantities, rules pertaining to source and destination node connections, etc.).

The physical or other transfers may be monitored through any quantity of any types of sensing devices coupled to the object or transporting device (e.g., RFID, GPS, scanning devices and corresponding codes/devices, etc.), and a status (e.g., real-time, periodic or other updates, updates as items are transferred between locations, etc.) of the progress of the transfer (e.g., initiated, completed, percentage or amount completed, etc.) may be provided. The sensing devices may be coupled to the system via any suitable communication mechanism (e.g., networks, wireless communication, wired communication, etc.). Any types of transfers (e.g., physical, electronic, etc.) may be monitored through any quantity of any types of monitoring mechanisms (e.g., sensors, network or signal monitoring, etc.). The status indicator may be represented by any graphical or visual object of any shape or size (e.g., circle, graph, chart, polygon, symbol, etc.), and may indicate progress of any type of transfer (e.g., physical, electronic, etc.) in any desired fashion (e.g., percentages, meter or chart, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of transferring items between source and destination nodes comprising:

performing, via a processor, a search for items based on an item category and selecting an item from the search and characteristics for the item;

performing, via a processor, a search for one or more source nodes and one or more destination nodes based on search criteria, wherein the search criteria include an amount of the item with the selected characteristics at the source nodes and the destination nodes;

generating, via a processor, a graphical object of each of the source and destination nodes resulting from the search based on the search criteria and presenting the graphical object of each of the source and destination nodes on a user interface;

manipulating, via a processor, a graphical connector to form connections between graphical objects of a first quantity of source nodes and a second quantity of destination nodes on the user interface to specify plural transfers between the first quantity of source nodes and the second quantity of destination nodes, wherein the plural transfers include transfers from plural source nodes to a same destination node, wherein a status indicator and a quantity actuator are disposed within the graphical object of each destination node of the second quantity on the user interface for each corresponding source node with a graphical object connected to the graphical object of that destination node, and wherein the quantity actuator includes increment and decrement actuators to specify a quantity of items for transfer;

manipulating, via a processor, one or more of the increment and decrement actuators of the quantity actuator of the graphical object of each destination node of the second quantity to specify the quantity of items for transfer to that destination node from each corresponding source node, wherein a plurality of first fields are disposed within the graphical object of each source node of the first quantity on the user interface to indicate a quantity of items at that source node and a quantity of items to transfer from that source node to each corresponding destination node, and wherein a second field is disposed within the graphical object of each destination node of the second quantity on the user interface to indicate a quantity of items at that destination node;

validating, via a processor, the plural transfers based on rules indicating quantities, nodes, and periods for transfer; and transferring from the first quantity of source nodes to each destination node of the second quantity for the plural transfers the quantity of items for transfer specified by the quantity actuator of the graphical object of that destination node based on the validating, wherein transferring includes:
  updating a corresponding status indicator of the graphical object of each destination node of the second quantity based on monitored progress of a corresponding transfer of the plural transfers for that destination node;
  updating, in the plurality of first fields of the graphical object of each source node of the first quantity, the quantity of items at that source node based on the quantity of items for transfer specified by the quantity actuator of a corresponding destination node; and
  updating, in the second field of the graphical object of each destination node of the second quantity, the quantity of items at that destination node based on the quantity of items for transfer specified by the quantity actuator of that destination node.

2. The method of claim 1, wherein the graphical connector connects graphical objects of a plurality of source nodes to a graphical object of a destination node to specify transfers of the plural transfers.

3. The method of claim 1, wherein the graphical connector connects a graphical object of a source node to graphical objects of a plurality of destination nodes to specify transfers of the plural transfers.

4. The method of claim 1, wherein the graphical connector connects graphical objects of a plurality of source nodes to graphical objects of a plurality of destination nodes to specify transfers of the plural transfers.

5. The method of claim 1, further comprising:
  monitoring, via sensing devices, progress of transfers between the first quantity of source nodes and the second quantity of destination nodes.

6. The method of claim 1, further comprising:
  removing a graphical connector between a graphical object of a source node and a graphical object of a destination node on the user interface to cancel a corresponding transfer.

7. A system for transferring items between source and destination nodes comprising:
  at least one processor configured to:
    perform a search for items based on an item category and select an item from the search and characteristics for the item;
    perform a search for one or more source nodes and one or more destination nodes based on search criteria, wherein the search criteria include an amount of the item with the selected characteristics at the source nodes and the destination nodes;
    generate a graphical object of each of the source and destination nodes resulting from the search based on the search criteria and present the graphical object of each of the source and destination nodes on a user interface;
    manipulate a graphical connector to form connections between graphical objects of a first quantity of source nodes and a second quantity of destination nodes on the user interface to specify plural transfers between the first quantity of source nodes and the second quantity of destination nodes, wherein the plural transfers include transfers from plural source nodes to a same destination node, wherein a status indicator and a quantity actuator are disposed within the graphical object of each destination node of the second quantity on the user interface for each corresponding source node with a graphical object connected to the graphical object of that destination node, and wherein the quantity actuator includes increment and decrement actuators to specify a quantity of items for transfer;
    manipulate one or more of the increment and decrement actuators of the quantity actuator of the graphical object of each destination node of the second quantity to specify the quantity of items for transfer to that destination node from each corresponding source node, wherein a plurality of first fields are disposed within the graphical object of each source node of the first quantity on the user interface to indicate a quantity of items at that source node and a quantity of items to transfer from that source node to each corresponding destination node, and wherein a second field is disposed within the graphical object of each destination node of the second quantity on the user interface to indicate a quantity of items at that destination node;
    validate the plural transfers based on rules indicating quantities, nodes, and periods for transfer; and
    initiate transfer from the first quantity of source nodes to each destination node of the second quantity for the plural transfers the quantity of items for transfer specified by the quantity actuator of the graphical object of that destination node based on the validating, wherein initiating transfer includes:
      updating a corresponding status indicator of the graphical object of each destination node of the second quantity based on monitored progress of a corresponding transfer of the plural transfers for that destination node;
      updating, in the plurality of first fields of the graphical object of each source node of the first quantity, the quantity of items at that source node based on the quantity of items for transfer specified by the quantity actuator of a corresponding destination node; and
      updating, in the second field of the graphical object of each destination node of the second quantity, the quantity of items at that destination node based on the quantity of items for transfer specified by the quantity actuator of that destination node.

8. The system of claim 7, wherein the graphical connector connects graphical objects of a plurality of source nodes to a graphical object of a destination node to specify transfers of the plural transfers.

9. The system of claim 7, wherein the graphical connector connects a graphical object of a source node to graphical objects of a plurality of destination nodes to specify transfers of the plural transfers.

10. The system of claim 7, wherein the graphical connector connects graphical objects of a plurality of source nodes to graphical objects of a plurality of destination nodes to specify transfers of the plural transfers.

11. The system of claim 7, further comprising sensing devices, and wherein the at least one processor is further configured to:
  monitor, via the sensing devices, progress of transfers between the first quantity of source nodes and the second quantity of destination nodes.

12. The system of claim 7, wherein the at least one processor is further configured to:

remove a graphical connector between a graphical object of a source node and a graphical object of a destination node on the user interface to cancel a corresponding transfer.

13. A computer program product for transferring items between source and destination nodes, the computer program product comprising one or more computer readable storage media collectively having program instructions embodied therewith, the program instructions executable by a processor to cause the processor to:

perform a search for items based on an item category and select an item from the search and characteristics for the item;

perform a search for one or more source nodes and one or more destination nodes based on search criteria, wherein the search criteria include an amount of the item with the selected characteristics at the source nodes and the destination nodes;

generate a graphical object of each of the source and destination nodes resulting from the search based on the search criteria and present the graphical object of each of the source and destination nodes on a user interface;

manipulate a graphical connector to form connections between graphical objects of a first quantity of source nodes and a second quantity of destination nodes on the user interface to specify plural transfers between the first quantity of source nodes and the second quantity of destination nodes, wherein the plural transfers include transfers from plural source nodes to a same destination node, wherein a status indicator and a quantity actuator are disposed within the graphical object of each destination node of the second quantity on the user interface for each corresponding source node with a graphical object connected to the graphical object of that destination node, and wherein the quantity actuator includes increment and decrement actuators to specify a quantity of items for transfer;

manipulate one or more of the increment and decrement actuators of the quantity actuator of the graphical object of each destination node of the second quantity to specify the quantity of items for transfer to that destination node from each corresponding source node, wherein a plurality of first fields are disposed within the graphical object of each source node of the first quantity on the user interface to indicate a quantity of items at that source node and a quantity of items to transfer from that source node to each corresponding destination node, and wherein a second field is disposed within the graphical object of each destination node of the second quantity on the user interface to indicate a quantity of items at that destination node;

validate the plural transfers based on rules indicating quantities, nodes, and periods for transfer; and initiate transfer from the first quantity of source nodes to each destination node of the second quantity for the plural transfers the quantity of items for transfer specified by the quantity actuator of the graphical object of that destination node based on the validating, wherein initiating transfer includes:

updating a corresponding status indicator of the graphical object of each destination node of the second quantity based on monitored progress of a corresponding transfer of the plural transfers for that destination node;

updating, in the plurality of first fields of the graphical object of each source node of the first quantity, the quantity of items at that source node based on the quantity of items for transfer specified by the quantity actuator of a corresponding destination node; and updating, in the second field of the graphical object of each destination node of the second quantity, the quantity of items at that destination node based on the quantity of items for transfer specified by the quantity actuator of that destination node.

14. The computer program product of claim 13, wherein the graphical connector connects graphical objects of a plurality of source nodes to a graphical object of a destination node to specify transfers of the plural transfers.

15. The computer program product of claim 13, wherein the graphical connector connects a graphical object of a source node to graphical objects of a plurality of destination nodes to specify transfers of the plural transfers.

16. The computer program product of claim 13, wherein the graphical connector connects graphical objects of a plurality of source nodes to graphical objects of a plurality of destination nodes to specify transfers of the plural transfers.

17. The computer program product of claim 13, wherein the program instructions further cause the processor to:

monitor, via sensing devices, progress of transfers between the first quantity of source nodes and the second quantity of destination nodes.

18. The computer program product of claim 13, wherein the program instructions further cause the processor to:

remove a graphical connector between a graphical object of a source node and a graphical object of a destination node on the user interface to cancel a corresponding transfer.

* * * * *